United States Patent
Fiederling et al.

(10) Patent No.: US 10,189,397 B2
(45) Date of Patent: Jan. 29, 2019

(54) LUMINANCE REGULATION IN EDGE REGIONS

(71) Applicant: OSRAM GmbH, Munich (DE)

(72) Inventors: Roland Fiederling, Friedberg (DE); Ronny Kürschner, Laaber (DE); Thomas Feil, Iggingen (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/766,400

(22) PCT Filed: Sep. 7, 2016

(86) PCT No.: PCT/EP2016/071009
§ 371 (c)(1),
(2) Date: Apr. 6, 2018

(87) PCT Pub. No.: WO2017/063792
PCT Pub. Date: Apr. 20, 2017

(65) Prior Publication Data
US 2018/0297510 A1    Oct. 18, 2018

(30) Foreign Application Priority Data
Oct. 13, 2015   (DE) .......................... 10 2015 219 789

(51) Int. Cl.
*G06F 3/038*   (2013.01)
*B60Q 1/14*    (2006.01)
*F21S 41/153*  (2018.01)

(52) U.S. Cl.
CPC ........... *B60Q 1/1415* (2013.01); *F21S 41/153* (2018.01)

(58) Field of Classification Search
CPC ..... G09G 2300/0842; G09G 2320/043; G09G 3/3233; G09G 2300/0861;
(Continued)

(56) References Cited

U.S. PATENT DOCUMENTS

| 2006/0139254 A1* | 6/2006 | Hayakawa | G09G 3/3216 345/76 |
| 2013/0021810 A1 | 1/2013 | Funk et al. | |
| 2015/0237720 A1* | 8/2015 | Van Ostrand | G06F 3/044 174/257 |

FOREIGN PATENT DOCUMENTS

| DE | 102011108384 A1 | 1/2013 |
| DE | 102012013963 A1 | 1/2014 |
| WO | 2014195347 A1 | 12/2014 |

OTHER PUBLICATIONS

International Search Report based on application No. PCT/EP2016/071009 (5 pages + 2 pages English translation) dated Nov. 9, 2016 (for reference purpose only).

(Continued)

*Primary Examiner* — Minh D A
(74) *Attorney, Agent, or Firm* — Viering Jentschura & Partner MBB

(57) ABSTRACT

According to the present disclosure, a method for operating an illumination apparatus is provided. The method has at least two light-emitting devices, which are arranged next to one another separated by a gap and each have a multiplicity of light-emitting elements, by individually driving all light-emitting elements of each light-emitting device, measuring a gap width of the gap and/or a luminance in the gap, and controlling or regulating in each case a luminance of one or more of the light-emitting elements which are arranged directly at the gap in dependence on the gap width and/or on the luminance in the gap.

10 Claims, 3 Drawing Sheets

(58) Field of Classification Search
CPC ... G09G 2300/0819; G09G 2320/0233; G09G 3/346; G09G 3/2022; G09G 2310/0235; G02B 26/0841
See application file for complete search history.

(56) References Cited

OTHER PUBLICATIONS

German Search Report based on application No. 10 2015 219 789.1 (8 pages) dated Jul. 4, 2016 (for reference purpose only).

\* cited by examiner

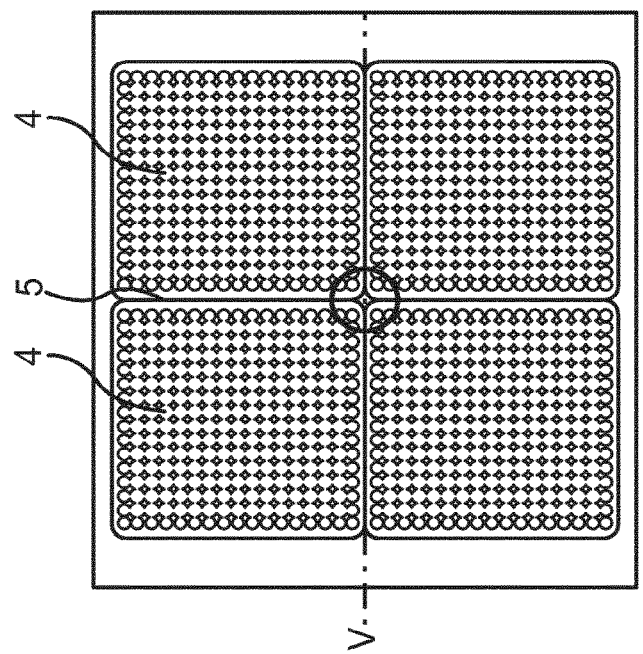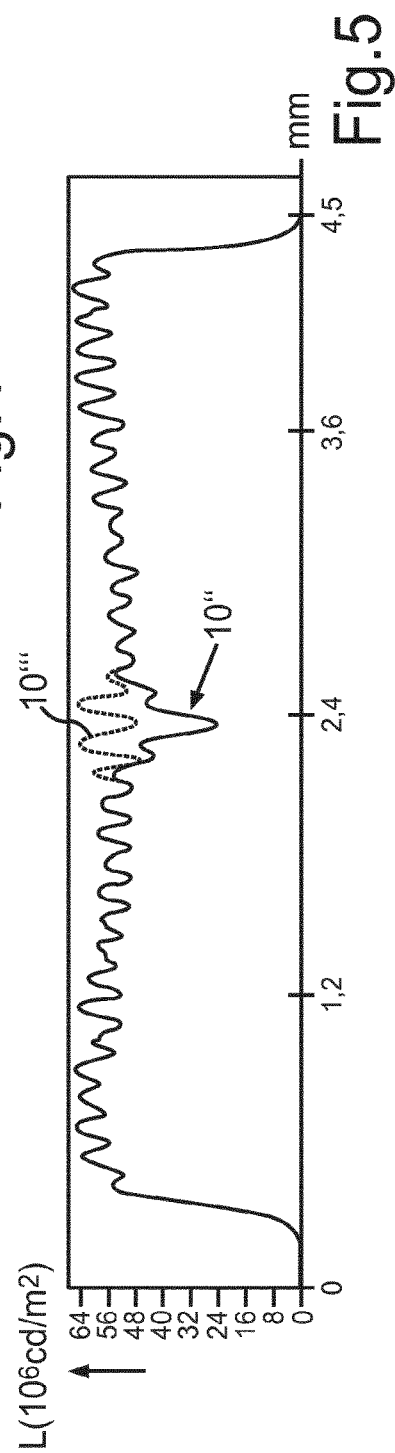

LUMINANCE REGULATION IN EDGE REGIONS

RELATED APPLICATIONS

The present application is a national stage entry according to 35 U.S.C. § 371 of PCT application No.: PCT/EP2016/071009 filed on Sep. 7, 2016, which claims priority from German application No.: 10 2015 219 789.1 filed on Oct. 13, 2015, and is incorporated herein by reference in its entirety.

TECHNICAL FIELD

The present disclosure relates to a method for operating an illumination apparatus which has at least two light-emitting devices, which are arranged next to one another separated by a gap and each have a multiplicity of light-emitting elements, for a motor vehicle by way of individually driving all light-emitting elements of each light-emitting device. Moreover, the present disclosure relates to an illumination apparatus for a motor vehicle having at least two light-emitting devices, which are arranged next to one another separated by a gap and each have a multiplicity of light-emitting elements, and a control device for individually driving all light-emitting elements of each light-emitting device. The present disclosure furthermore relates to a motor vehicle having such an illumination apparatus.

BACKGROUND

Modern motor vehicles have, for example, what are known as pixel headlights, with which it is possible to drive individual light points, or pixels, in larger matrix. By individually driving each pixel in this manner, it is possible to selectively illuminate individual regions in front of the motor vehicle using a corresponding motor vehicle headlight.

A pixel headlight is realized, for example, by a matrix of LEDs. This gives a light-emitting surface, which can also be referred to as an LED surface, a chip surface or an LED having high pixilation.

The largest possible size of a monolithically produced light-emitting surface in the case of semiconductor light sources is limited due to production technology. If the aim is to generate a larger light-emitting surface, it is necessary for the light source having this size or above to be divided into a plurality of individual LED surfaces and to arrange them as closely together as possible so as to achieve a luminance that is as homogeneous as possible over the entire surface. The illumination apparatus which is attainable hereby thus has a matrix-type structure.

For reasons of production technology, however, it is necessary to maintain a gap between the individual light-emitting devices, i.e. the LED surfaces or chip surfaces. This gap is produced due to the fact that it is necessary, for example, for a single chip, produced by epitaxy, having high pixilation to be scribed at the edge using diamonds and subsequently broken, or alternatively to be sawn. In such a separation method, a tolerance region must be observed at the edge so as to not damage the external LEDs. If two such chips or light-emitting devices are joined together, a corresponding gap for example of 0.02 to 0.12 mm is formed between them. Due to this gap, a drop in luminance occurs in the luminance distribution over the entire surface.

The LEDs or the chip surfaces can be directly emitting light-emitting diodes, i.e. light-emitting diodes that emit substantially in monochrome in the visible, infrared or ultraviolet spectral range, and/or what are known as phosphor-converting light-emitting diodes (in this case preferred), i.e. light-emitting diodes in which e.g. blue light emission from the semiconductor chips is incident on a phosphor that is applied on the chip surface. The phosphor, also referred to as conversion element, can for example here be a yellow cerium-YAG-phosphor (Ce:YAG) that partially converts the blue excitation radiation into yellow conversion light. The superposition of non-converted blue excitation light and yellow conversion light then produces the used light that has a blue-white, white or yellow-white color impression, depending on the degree of conversion of the phosphor arrangement. In the automotive industry, the color point of a light source of a front headlight for low beam and high beam is regulated by the ECE standard.

It is therefore the object of the present disclosure to provide a method with which it is possible to better avoid a marked reduction in the luminance distribution in a gap between two light-emitting devices when driving an illumination apparatus. Moreover, a corresponding illumination apparatus is to be proposed.

SUMMARY

This object is achieved according to the present disclosure by way of a method as claimed in claim 1 and an illumination apparatus as claimed in claim 9. Advantageous developments of the present disclosure can be gathered from the dependent claims.

Accordingly provided in accordance with the present disclosure is a method for operating an illumination apparatus having at least two light-emitting devices that are arranged next to one another separated by a gap and each have a multiplicity of light-emitting elements for a motor vehicle by way of individually driving all light-emitting elements of each light-emitting device, measuring a gap width of the gap and/or a luminance in the gap, and controlling or regulating in each case a luminance of one or more of the light-emitting elements which are arranged directly (optionally also with a small distance) at the gap in dependence on the gap width and/or on the luminance in the gap and optionally also on the position of the light-emitting element in the matrix.

Moreover provided in accordance with the present disclosure is an illumination apparatus for a motor vehicle having at least two light-emitting devices that are arranged next to one another separated by a gap and each have a multiplicity of light-emitting elements, and a control device for individually driving all light-emitting elements of each light-emitting device, and having a memory device for providing a measurement of a gap width of the gap and/or a luminance in the gap, wherein the control device is configured for controlling or regulating in each case a luminance of one or more of the light-emitting elements which are arranged directly at the gap in dependence on the gap width and/or on the luminance in the gap and optionally also on the position of the light-emitting element in the matrix.

The illumination apparatus thus has at least two light-emitting devices which are arranged one next to the other separated by a gap. By way of example, these can be in each case rectangular light-emitting devices which are joined together on one side. Alternatively, they can be e.g. four rectangular or square light-emitting devices which have been joined together to form a larger rectangle or square, in this case with a cross-shaped gap being produced between the individual light-emitting devices. Moreover, it is also possible to join triangular light-emitting devices together, which produces a gap having 3, 4, 5 etc. ends between them. Any other arrangements are also possible.

Each of the light-emitting devices has a multiplicity of light-emitting elements. These light-emitting elements are arranged advantageously in the form of a matrix. Each light-emitting element can be an LED or another point-shaped or strip-shaped light source.

The light-emitting elements of all light-emitting devices are controlled individually. This means that the light-emitting elements are variable in terms of their luminosity or luminance independently of one another. It is possible in this way to obtain any desired light patterns. This independent drivability, however, is advantageously also used to obtain a light distribution that is as homogeneous as possible over a plurality of light-emitting devices, and not just during nominal-power operation of the individual light-emitting elements, but also at reduced power stages, i.e. for example during dimmed operation.

As input parameter for the control or regulation of the illumination apparatus, the gap width of the gap and/or the luminance in the gap between the light-emitting devices can be used. These input variables must be measured individually for each illumination apparatus because they vary due to manufacturing technology. For example, in chips produced by epitaxy, a gap of between, for example, 0.02 and 0.12 mm can form during joining, as mentioned in the introductory part. This variable gap width has a corresponding effect on the luminance distribution at an angle to the gap. According to a first alternative, the gap width of the gap can be measured, and a model is used to deduce the corresponding luminance distribution at the gap. Alternatively, the luminance in the gap can also be measured directly. "In the gap" here refers to a location directly in the gap or perpendicularly above it or in a specified optical path of the gap. If required, it is also possible for both parameters, gap width and luminance in the gap, to be measured and to be used together, for example to increase the accuracy for controlling or regulating purposes.

Finally, the luminance of one or more of the light-emitting elements which are arranged directly at the gap is controlled or regulated in dependence on the gap width and/or on the luminance in the gap. In other words, in particular light-emitting elements at the edge of each light-emitting device, said edge in each case being aligned with the gap, are regulated specifically in dependence on gap width or luminance in the gap. The pixels can be regulated such that the required contrast values are observed. Contrast value in this context means that a specific luminance contrast must exist between a pixel, or a pixel row, that is switched on and a pixel, or pixel row, that is switched off, for example 1:50, 1:100, 1:200. The driving method can here take account of the fact that the luminance of each of the edge pixels does not exceed an individually specifiable luminance value (individual maximum value). By way of example, the maximum value can refer to the average luminance of a row or to the sum luminance of the entire illumination apparatus. Light loss due to the gap can thus be equalized in a targeted fashion. Advantageously, a measurement of in each case a luminance of the one or more of the light-emitting elements that are arranged directly at the gap is additionally performed, and the controlling or regulating is also performed in dependence on the corresponding measurement value/values. The luminance of the light-emitting elements located at the edge can thus be used as a basis for the regulation of the luminance of the light-emitting elements (e.g. LEDs).

Furthermore, during the controlling or regulating, a luminance of one of the light-emitting elements that are arranged directly at the gap can be adapted to an average luminance of all the light-emitting elements, or a multiplicity of the light-emitting elements, of the light-emitting devices. By way of example, if all the light-emitting elements, or a majority thereof, are measured with respect to their luminance, it is possible for the luminance in the gap to be set to a corresponding average value or to a value that must lie around the average value within a specifiable interval, for example in the range of at most 1.2 times the average value and at least 0.8 times the average value. By way of example, it is necessary in a luminance gradient to determine the average luminance value over a row and to set the luminance in the gap to the corresponding average value of the row. In this case, the multiplicity of the light-emitting elements used for regulating the luminance in the gap corresponds to, for example, all the light-emitting elements or the majority of the light-emitting elements in a row or column of the light-emitting elements which are arranged in the form of a matrix.

Specifically, it is also possible for the light-emitting elements located in a second and/or third row behind the light-emitting elements that are arranged directly at the gap to be affected by the controlling or regulating. In other words, it is not only the light-emitting elements located directly at the gap that are regulated specifically for equalizing the luminance, but also light-emitting elements that are located further to the rear and have an influence on the luminance in or at the gap, which influence decreases as the distance from the gap increases. By way of example, the luminances can increase toward the gap in accordance with a ramp with a linear or non-linear function.

In accordance with a further embodiment, the illumination apparatus can have at least one further light-emitting device, wherein respective corners of each of the light-emitting devices are arranged in mutually adjoining fashion and, for controlling or regulating a light-emitting element at one of the corners of one of the light-emitting devices, in each case a luminance of a light-emitting element in each of the other adjoining corners is taken into consideration. If, for example, four square light-emitting surfaces adjoin, the luminances at the corner points of the four light-emitting devices influence one another. Thus, for controlling or regulating a luminance of a light-emitting element, it is not only the luminances of the light-emitting elements of their own light-emitting device (e.g. LED surface or chip surface) that are used, but also the luminance or luminances of light-emitting elements of other light-emitting devices. That means that, at the boundaries, the luminances influence each other over a plurality of light-emitting devices.

Furthermore, during the controlling or regulating, a luminance of one of the light-emitting elements that are arranged at an edge region of the respective light emitting device that is not directly adjoined by a light-emitting device can be adapted to an average luminance of all light-emitting elements of the light-emitting devices. That means that not only the boundary between two light-emitting devices is homogenized with respect to their luminance, but that it is intended for a specified setpoint luminance to be achieved at the edge of the light-emitting devices. What is also taken into account here is that no light-emitting elements that could influence the luminance at the edge are left beyond the edge.

Controlling or regulation can be effected, for example, using a correction matrix. In a correction matrix of this type, the influence factors of the respectively neighboring light-emitting elements of all light-emitting elements of the light-emitting devices could be taken into consideration by predeterminations. It would thus be possible to perform controlling or regulating in a correspondingly quick manner. Regulating or controlling each individual light-emitting element can mean in particular that each light-emitting element is operated at an individual current value and/or duty cycle value, for example a pulse width modulation PWM. Alternatively, the optimization of the luminance at the edge or at the gap could also be performed using Monte-Carlo simulations. Here, the drive values, for example current and duty cycle, for the light-emitting elements are varied until an optimal distribution is obtained.

The measurement of the luminance can be performed in pulsed fashion at ambient temperature or in a thermally stable on-state. The luminance measurement in LEDs is typically performed in the cold state, i.e. at ambient temperature. This remains substantially unchanged if only short pulses are used for the luminance measurement. If the on-time is longer, the light-emitting element (e.g. the diode) generally heats up, which results in a drop in the luminance. It is nevertheless possible to perform a luminance measurement even in a thermally stable operating state. The measurement is performed, as mentioned above, prior to the use in the vehicle. During operation, it is possible for example for a cluster of light-emitting elements in a corner to be switched on. Only one individual pixel at the other corner. Since the cluster heats up more than the individual light-emitting element, the luminance drops more for the cluster.

The features described above in connection with the method according to the present disclosure can also serve as respective functional features of the aforementioned illumination apparatus according to the present disclosure. In this way, the advantages for the method according to the present disclosure can also be transferred to the illumination apparatus.

The illumination apparatus, as has been described above, can specifically be used in a motor vehicle, e.g. as front headlights, but also for building illumination (inside and out), marine searchlights, effect illumination, projection devices for data, video and film projections, head-up displays, medical examination, analysis, device and therapy lights, for industrial image processing, as (blue/UV) illumination in the printing industry (e.g. curing of adhesive) and for functional representation of images etc. Moreover, it can also be used for other dynamic applications and for static illumination apparatuses. At any rate, luminance drops as occur due to gaps between light-emitting devices are avoided or reduced.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 4 shows an embodiment having four square light-emitting devices; and

FIG. 5 shows a luminance distribution at an edge region of two of the light-emitting devices of FIG. 4.

DETAILED DESCRIPTION

The embodiments which will be explained in more detail below represent preferred embodiments of the present disclosure. It should be noted in this respect that the features can be implemented not only in the combinations stated here, but also in other, technically meaningful combinations or even alone.

Figure 1:
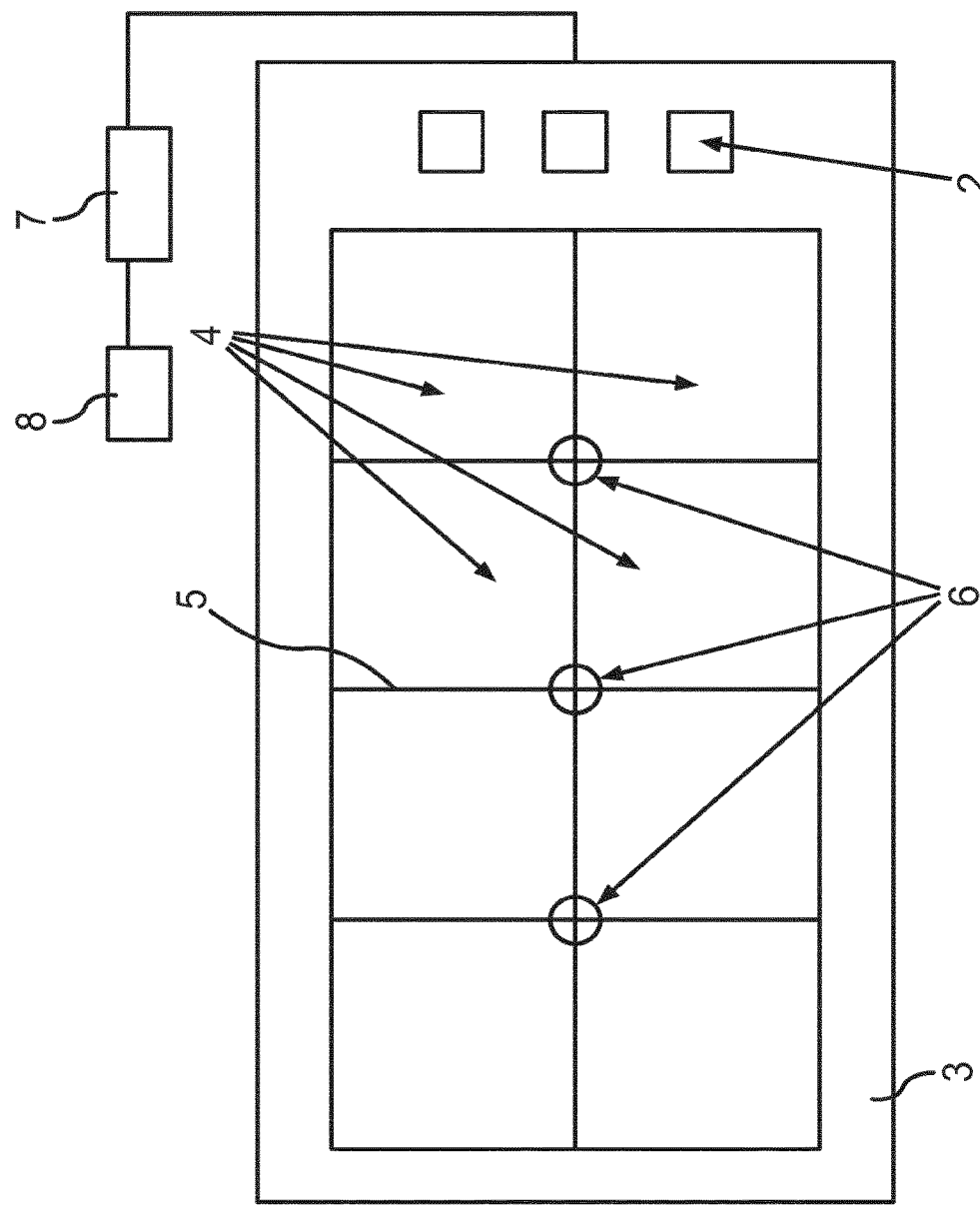
FIG. 1 shows a plan view of an example of an illumination apparatus with circuitry that is indicated symbolically.

FIG. 1 shows an embodiment of an illumination apparatus, as can be used for example for a motor vehicle. It has a drive chip 3 having a drive interface 2. The drive chip 3 can be made of silicon.

Arranged on the drive chip 3 are in this case eight square light-emitting devices 4 such that they directly adjoin one another. The light-emitting devices 4 are, for example, LED chips having in each case one matrix of e.g. n×n LEDs or light-emitting elements. The individual light-emitting devices 4 are separated from one another by a respective gap 5. In the example of FIG. 1 with the eight light-emitting devices 4, the gap has a grid shape and consists of a plurality of individual gaps that start at intersection points 6. The number, size and shape of the light-emitting devices 4 and of the light-emitting elements themselves can differ within an illumination apparatus.

The illumination apparatus must have at least two light-emitting devices which are separated from one another by a gap 5. However, it can also have 3, 4, 5, 6 etc. light-emitting devices or LED chips or the like.

The entire arrangement of the light-emitting devices does not have to be arranged centrally on the drive chip 3. Rather, the arrangement can also be arranged eccentrically on the drive chip 3. The light-emitting devices 4 do not have to be square components either. For example, they can also have a rectangular shape or a different geometry.

A light-emitting device 4 is produced for example by epitaxy and can therefore be referred to as "individual epitaxy." This is then understood to mean, as mentioned, e.g. the chip surface, the LED surface or the LED of high pixilation etc.

Each light-emitting device is generally produced on a wafer and is broken or sawed out of the wafer at the end of said process. For breaking, it is initially typically scribed using a diamond, such that the breaking line can be defined relatively exactly. However, during breaking, but also during sawing, some tolerances due to production technology occur. However, that means that two light-emitting devices which immediately adjoin one another are separated from one another by a gap whose width can vary. When using individual epitaxies as light-emitting devices 4, typical gap widths of 0.02 to 0.12 mm occur. An average gap width of about 0.08 mm is obtained due to the fact that an individual epitaxy cannot be broken exactly at the edge of the outermost LEDs for safety reasons. Rather, a safety edge is observed so as not to damage the outermost LEDs.

The illumination apparatus is driven using a control device 7. The latter makes it possible that each individual pixel, embodied by a respective light-emitting element (e.g. individual LED), can be driven individually. The control device 7 receives a measurement value from a memory device 8 as an input variable. Said memory device 8 can provide, for example, the gap width of the gap 5 for the control device 7. Alternatively or additionally, the memory device 8 can also provide a luminance in the gap 5 for the control device 7. If required, the memory device 8 can also provide values for luminances in other regions of the light-emitting devices 4. The control device 7 uses one or more such provided values for controlling or regulating the luminance of the individual light-emitting devices 4 or of the individual light-emitting elements of each of the light-emitting devices. That means that the control device 7 can control e.g. each individual LED with respect to its luminance.

Figure 2:
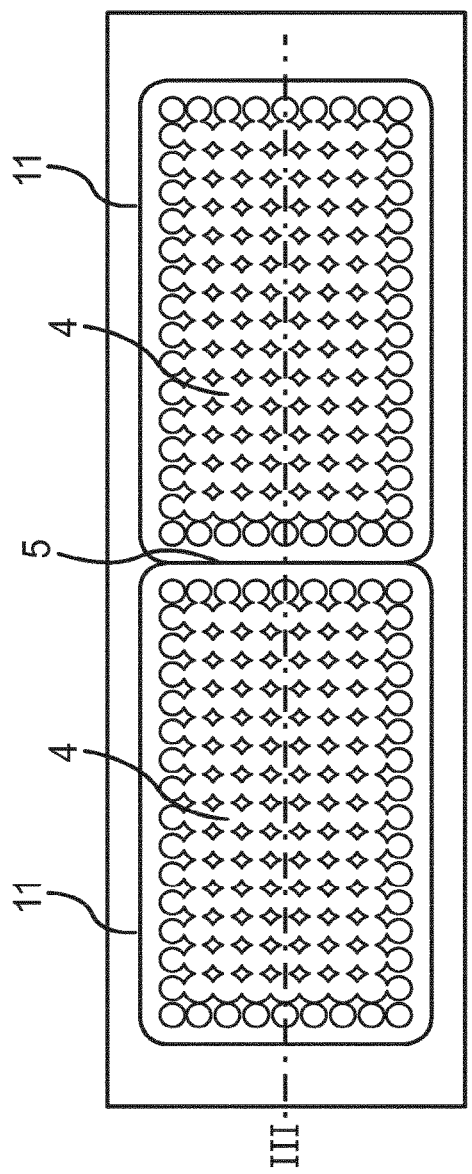
FIG. 2 shows a plan view of two light-emitting devices which are arranged one next to the other during operation.

FIG. 2 shows a plan view of the light-emitting region of an illumination apparatus having two light-emitting devices 4. Each of these light-emitting devices 4 here has 8×16 light-emitting elements, e.g. LEDs. However, the light-emitting devices can also be square light-emitting surfaces, in which, in accordance with the example of FIG. 2, only 50% of the pixels or light-emitting elements are switched on. The control device 7 operates the individual LEDs for example using pulse width modulation (PWM).

The greater the luminance, the lighter the appearance of the respective region in FIG. 2. Light light-emitting regions transition into one another, while darker light-emitting regions are illustrated in the form of closed circles. The circles are a symbolic representation of luminances, while the individual chips can certainly be square, for example. The luminance values can range e.g. from 0 to $100 \times 10^6$ $cd/m^2$. It is clear that, despite identical energization, the LEDs in the center of the light-emitting device 4 appear light, while they appear darker toward the perimeter. This is due to the natural light distribution according to which for a point-shaped light source, the luminance drops in the radial direction in an approximately Gaussian manner. This in turn means that the luminance in the region of an individual LED is dependent not only on the luminance of said LED, but also on the luminances of the LEDs in its vicinity. The luminance distributions of all individual LEDs or light-emitting elements thus superpose to form a total luminance distribution.

Figure 3:
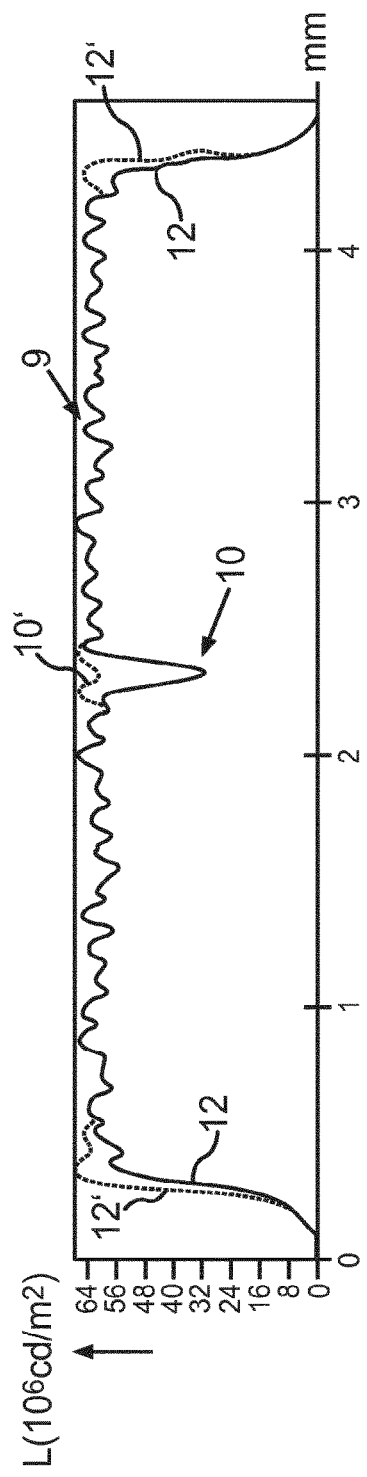
FIG. 3 shows a luminance distribution of the light-emitting devices of FIG. 2 along a specified line.

FIG. 3 shows a section III through the two-dimensional luminance distribution of FIG. 2. This luminance distribution along a row of the illumination apparatus shows a waviness 9 as results from the local resolution of the chip surfaces on the basis of the individual LEDs. Located centrally between the two light-emitting devices 4 is the gap 5. At the location of the gap, the luminance distribution according to FIG. 3 exhibits a local minimum 10. This is increasingly pronounced as the width of the gap 5 increases if the pixels or light-emitting elements adjoining the gap 5 are all driven in the same way, e.g. at 100%.

The luminance at the outer edge 11 of each light-emitting device 4 also decreases as compared to the central regions of the light-emitting devices 4 because here, each individual light-emitting element has fewer neighbors that contribute to the luminance. As a consequence, a significant drop already occurs at the outermost row of light-emitting elements as compared to the luminance at the center of the light-emitting devices 4. Outside the light-emitting devices 4, the luminance drops with a flank 12.

This drop in luminance is undesired, but can be reduced with targeted driving of the edge pixels or light-emitting elements at the edge of the light-emitting devices 4. It is thus possible, for example, to drive the pixels or light-emitting elements that immediately adjoin the gap 5 in a targeted fashion toward a higher luminance, so that the crosstalk of the individual light-emitting elements is stronger beyond the gap 5. As a result, a luminance distribution 10' can be obtained in gap 5, which luminance distribution 10' now hardly differs from the waviness in the other light-emitting regions of the light-emitting devices. The luminance of the individual light-emitting elements can also be highly regulated at the outer edges 11, which represent the edge regions that are not adjoined by light-emitting devices. It could thus be possible to counteract the drop that would otherwise occur at the edge, and an improved flank profile 12' might be obtained at the edges 11.

However, since the gap width varies due to production technology, the luminance at the gap edges cannot be increased in equal fashion in all light-emitting devices or illumination apparatuses. Rather, an individual measurement of the gap width is necessary. Such a measurement can be performed, for example, at the end of production or after installation in a vehicle headlight, and a corresponding measurement value is stored in the illumination apparatus. It is possible to deduce the local minimum 10 or the equalizing increase in luminances of the light-emitting elements at the gap edge from the measured gap width using a model, for example. Alternatively, the luminance in the gap can also be measured directly for measuring the gap width. The current in the light-emitting elements at the gap edge can then be increased, for example, until a more homogenized light distribution has also been obtained beyond the gap. Optimization with respect to the homogeneity can be effected, for example, using Monte-Carlo simulations. Here, for example, the luminance values are measured and varied until an improved value is also obtained in the gap. For example, an average value of the luminances over all luminances or over the luminance distribution in the central region of the light-emitting devices would be optimum. Similarly, the driving of the neighboring pixels of the edge pixels can likewise be adapted so as to achieve a smooth profile of the luminance.

FIG. 4 shows an illumination apparatus having four square light-emitting devices 4, in which all pixels are driven for example at 100%. Once again, lighter regions exist in the center of the light-emitting devices, and darker regions at the edge of the respective light-emitting devices. A particular luminance drop occurs at the intersection point 6 of the individual gaps. The four corner pixels of the four light-emitting devices 4, which are located on the light source, are contributors here. At this location, the luminance component of all corner pixels of the four contributing light-emitting devices must be taken into consideration during the setting.

FIG. 5 shows a horizontal section V through the luminance distribution of FIG. 4. (The section V could likewise be vertical.) Especially pronounced is here the local minimum 10" in the vicinity of the intersection point 6. In order to also achieve equalization here with respect to a homogeneity in the intersection point 6, the corner points of the four contributing light-emitting devices 4 must be driven at a corresponding level so as to also achieve, if appropriate, a luminance profile 10'" with a high homogeneity in the intersection point region.

The general homogeneity of the luminance of the individual light-emitting elements or pixels can be ensured, for example, by saving a correction matrix using software after initial measurement of all pixels. This measurement can be optionally performed in pulsed fashion in the "cold" state, i.e. at ambient temperature, and also in the thermally stabilized operating state. The orientation of the light-emitting arrangement during real operation, i.e. for example in a vehicle headlight, is vertical, that is to say with a substantially horizontal surface normal on the emission surface. The correction matrix is also advantageously ascertained during the vertical operating mode of the light-emitting arrangement.

The present disclosure can be applied not only in phosphor-converting white-emitting light-emitting elements, but also in light-emitting arrangements in which the chip surfaces are provided with color-converting phosphor, for example red or green, operating with partial or full conversion.

The present disclosure can furthermore also be applied to surface chip arrangements in which the gap extends along a curved line, for example along an arc in the shape of a circular segment. In this case, the boundary surface of the chip arrangement is convex, that of the opposite chip arrangement is concave.

Although it is preferred for all surfaces of the individual light-emitting elements (pixels) to be of the same size, the present disclosure can also be applied to light-emitting element arrangements in which the chip surfaces of the individual light pixels have different sizes.

The present disclosure is also applicable to a matrix-type arrangement of pixelated, organic light-emitting diodes (OLED).

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A method for operating an illumination apparatus, having at least two light-emitting devices, which are arranged next to one another separated by a gap and each have a multiplicity of light-emitting elements, by
    individually driving all light-emitting elements of each light-emitting device,
    measuring a gap width of the gap and/or a luminance in the gap, and
    controlling or regulating in each case a luminance of one or more of the light-emitting elements which are arranged directly at the gap in dependence on the gap width and/or on the luminance in the gap.

2. The method as claimed in claim 1, wherein in the method a measurement of a luminance of each of the one or more of the light-emitting elements which are arranged directly at the gap is further performed and
    the controlling or regulating is performed also in dependence on the corresponding measurement value/values.

3. The method as claimed in claim 2, wherein the measurement of the luminance is performed in pulsed fashion at ambient temperature or in a thermally stabilized on-state.

4. The method as claimed in claim 1, wherein, during the controlling or regulating, a luminance of one of the light-emitting elements that are arranged directly at the gap is adapted to an average luminance of all the light-emitting elements, or a multiplicity of the light-emitting elements, of the light-emitting devices.

5. The method as claimed in claim 1, wherein the light-emitting elements located in a second and/or third row behind the light-emitting elements that are arranged directly at the gap are also affected by the controlling or regulating.

6. The method as claimed in claim 1, wherein the illumination apparatus has at least one further light-emitting device, wherein respective corners of each of the light-emitting devices are arranged in mutually adjoining fashion and, for the controlling or regulating of a light-emitting element at one of the corners of one of the light-emitting devices, in each case a luminance of a light-emitting element of each of the other corners is taken into consideration.

7. The method as claimed in claim 1, wherein, during the controlling or regulating, a luminance of one of the light-emitting elements that are arranged at an edge region of the respective light emitting device that is not directly adjoined by a light-emitting device is adapted to an average luminance of all light-emitting elements of the light-emitting devices.

8. The method as claimed in claim 1, wherein the controlling or regulating is performed by means of a correction matrix.

9. An illumination apparatus for a motor vehicle, having
    at least two light-emitting devices, which are arranged next to one another separated by a gap and each have a multiplicity of light-emitting elements, and
    a control device for individually driving all light-emitting elements of each light-emitting device,
    a memory device for providing a measurement of a gap width of the gap and/or a luminance in the gap, wherein the control device is configured for controlling or regulating in each case a luminance of one or more of the light-emitting elements which are arranged directly at the gap in dependence on the gap width and/or on the luminance in the gap.

10. A motor vehicle having an illumination apparatus as claimed in claim 9.

* * * * *